United States Patent [19]

Walden et al.

[11] 4,455,618
[45] Jun. 19, 1984

[54] PROGRAMMABLE CALCULATOR

[75] Inventors: Jack M. Walden; William D. Eads; Ray J. Cozzens; John L. Bidwell; Robert A. Jewett; Martin S. Wilson; Daniel J. Griffin; Robert E. Kuseski; Louis T. Schulte, all of Loveland, Colo.

[73] Assignee: Hewlett-Packard Company, Palo Alto, Calif.

[21] Appl. No.: 236,394

[22] Filed: Feb. 20, 1981

Related U.S. Application Data

[60] Continuation of Ser. No. 44,421, Jun. 1, 1979, abandoned, which is a division of Ser. No. 837,771, Sep. 29, 1977, Pat. No. 4,180,854.

[51] Int. Cl.³ .............................................. G06F 15/02
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,859,635 | 1/1975 | Watson et al. | 364/200 |
| 4,009,379 | 2/1977 | Musch | 364/900 |
| 4,107,782 | 8/1978 | Cochran | 364/200 |

Primary Examiner—Thomas M. Heckler
Attorney, Agent, or Firm—William E. Hein

[57] ABSTRACT

A programmable calculator employs modular read-write and read-only memories separately expandable to provide additional program and data storage functions within the calculator oriented toward the environment of the user and two sixteen bit LSI NMOS central processing units. One of the central processing units (LPU) is employed to perform language syntaxing, arithmetic, and general supervision of program execution. The second central processing unit (PPU) is employed for managing input/output operations. Communication between the two central processing units is accomplished by an arrangement through which the two central processing units share a common portion of memory. The calculator also includes a keyboard having a full complement of alphanumeric keys for entering programs and data into the calculator and for otherwise allowing the user to control operation of the calculator. The keyboard further includes a plurality of user-definable keys, some of which are pre-defined to have certain definitions at the time operating power is applied to the calculator.

1 Claim, 3 Drawing Figures

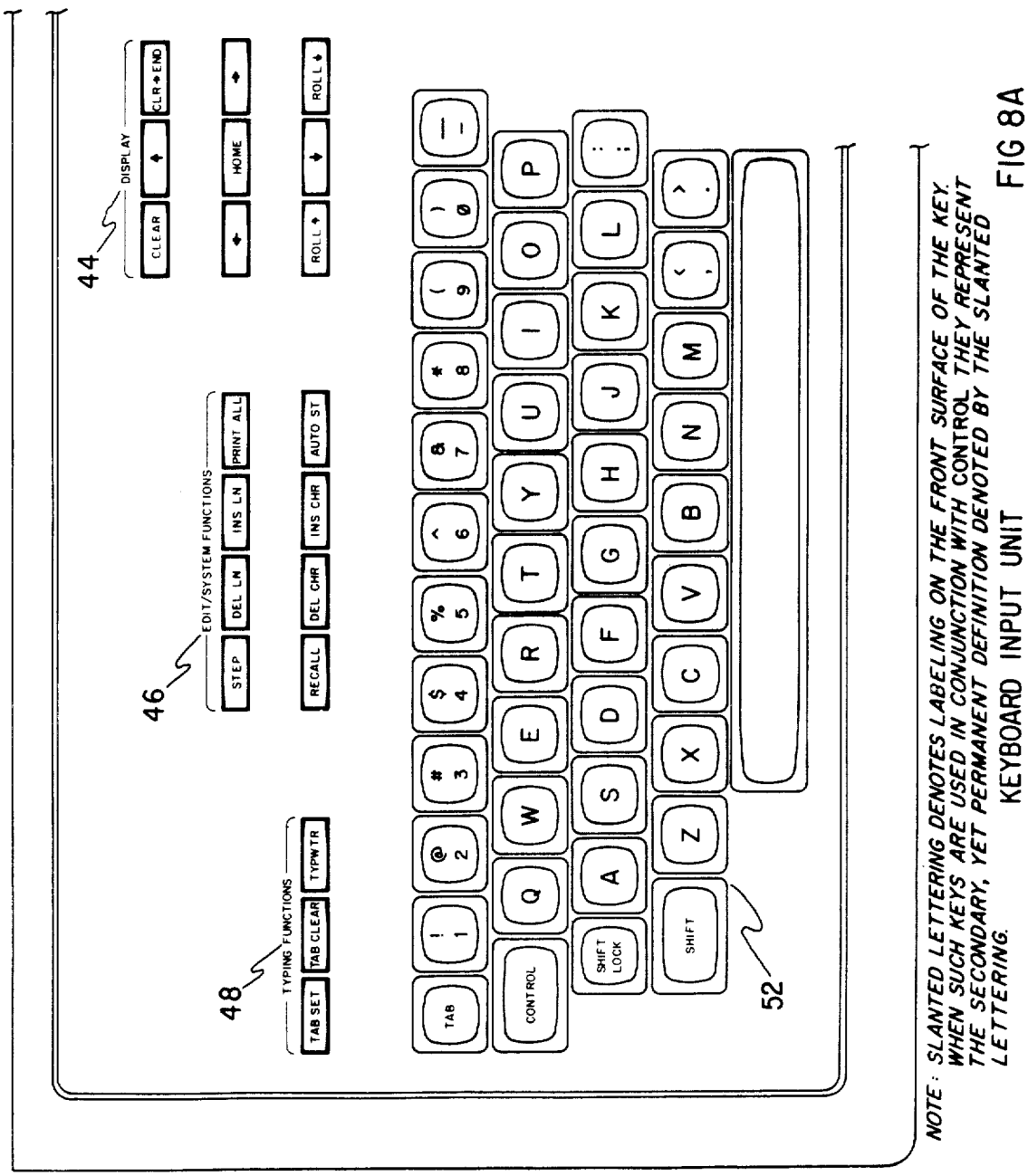
FIG 8A  KEYBOARD INPUT UNIT
NOTE: SLANTED LETTERING DENOTES LABELING ON THE FRONT SURFACE OF THE KEY. WHEN SUCH KEYS ARE USED IN CONJUNCTION WITH CONTROL THEY REPRESENT THE SECONDARY, YET PERMANENT DEFINITION DENOTED BY THE SLANTED LETTERING.

PROGRAMMABLE CALCULATOR

CROSS REFERENCE TO RELATED APPLICATIONS

This is a continuation of application Ser. No. 44,421, filed June 1, 1979, abandoned which is in turn a divisional of application Ser. No. 837,771, filed Sept. 29, 1977, now issued as U.S. Pat. No. 4,180,854. The subject matter of U.S. Pat. No. 4,180,854 is incorporated herein by reference.

BACKGROUND AND SUMMARY OF THE INVENTION

This invention relates generally to calculators and more particularly to programmable calculators that may be controlled both manually from the keyboard and automatically by means of a stored program.

Calculators constructed according to the prior art have generally been limited in functional capability due to restrictions imposed on the size of memory. To insulate the user from the complexities of standard computer operating systems that embody compile and load techniques, desktop calculators have generally employed interpreters. While these calculators result in simplifying the user/machine interface, that result is achieved at the expense of increased memory consumption because the interpreter, the user's program, and the user's data must all occupy the same address space. This condition is aggravated by attempted language enhancements that require additional address space, thus robbing the user of more and more of his memory space. Various proposed solutions to this general problem of insufficient memory space, such as the use of virtual memory, have generally been expensive and complex and thus have not proven practical for incorporation in desk-top calculators. The calculator constructed according to the present invention solves this problem by employing a memory address extension scheme that provides a tremendous increment in available memory address space while permitting the use of standard off-the-shelf processors and memory components. This arrangement is advantageous over the mere expedient of increasing the number of address bits by some small number. Memory address extension, as employed in the present calculator, utterly removes the upper limit on the amount of available address space. This is accomplished by dividing the memory into a plurality of 32K word fifteen-bit address spaces called blocks, of which there may be as many as 64K. The calculator includes an operating system that automatically controls a memory address extension circuit to arbitrarily determine which two blocks represent the processor's native sixteen-bit address space. By that arrangement, those blocks of memory that are intended for storage of the user's program and data are preserved exclusively for the user in spite of the fact that additional memory is required to implement desired language enhancements.

Conventional calculators have also proven disadvantageous due to their relatively slow program execution. Attempts at solving this problem by merely increasing the speed of the processor have been met with various practical limitations such as memory cycle time. In order to increase program execution speed the present calculator employs direct memory addressing (DMA), an operating system that is structured to accomodate an interrupt system, I/O buffering, and a dual processor architecture that divides the operations performed by the calculator between two processors. As a result, the present calculator provides a high-speed Basic language interpreter that includes desirable language enhancements while providing the user with more read-write memory than heretofore available in desk-top calculators.

Among the language enhancement features made possible by the expanded memory of the present calculator are an editline mode capability for enhancing, particularly in conjunction with a CRT, editing and program entry operations, an edit statement that permits the editing of string variables under program control, a CRT display mode that is segmented in a manner which organizes the displayed information more usefully, program selectable serial and overlap modes of I/O operation, a group of control keys that enable the user to generate a pseudo-interrupt incorporating a priority scheme, program control of a live keyboard, multiple nondestructive, bidirectional recall of information entered from the keyboard, a CRT-to-printer dump mode that permits a dot-for-dot transfer of a graphics image appearing on the CRT to the printer, and the ability to modify stored programs during execution.

In addition, the calculator provides a number of advanced features that involve the thermal printer located within the calculator mainframe. A number of these features combine to provide quiet, high-speed printer operation while minimizing power consumption. For example, a single monolithic print head enhances dot-for-dot CRT-to-printer dump capability by providing printable dot positions within the normally blank space between adjacent characters.

Many other features of this invention will become apparent to those persons skilled in the art from an examination of the following detailed description and drawings.

DESCRIPTION OF THE DRAWINGS

The following figures have been numbered in correspondence with the same figures of U.S. Pat. No. 4,180,854, cited above as being incorporated by reference.

FIGS. 8A-B are a plan view of the keyboard input unit of the programmable calculator of FIG. 1.

DESCRIPTION OF THE PREFERRED EMBODIMENT

GENERAL DESCRIPTION

Figure 1:
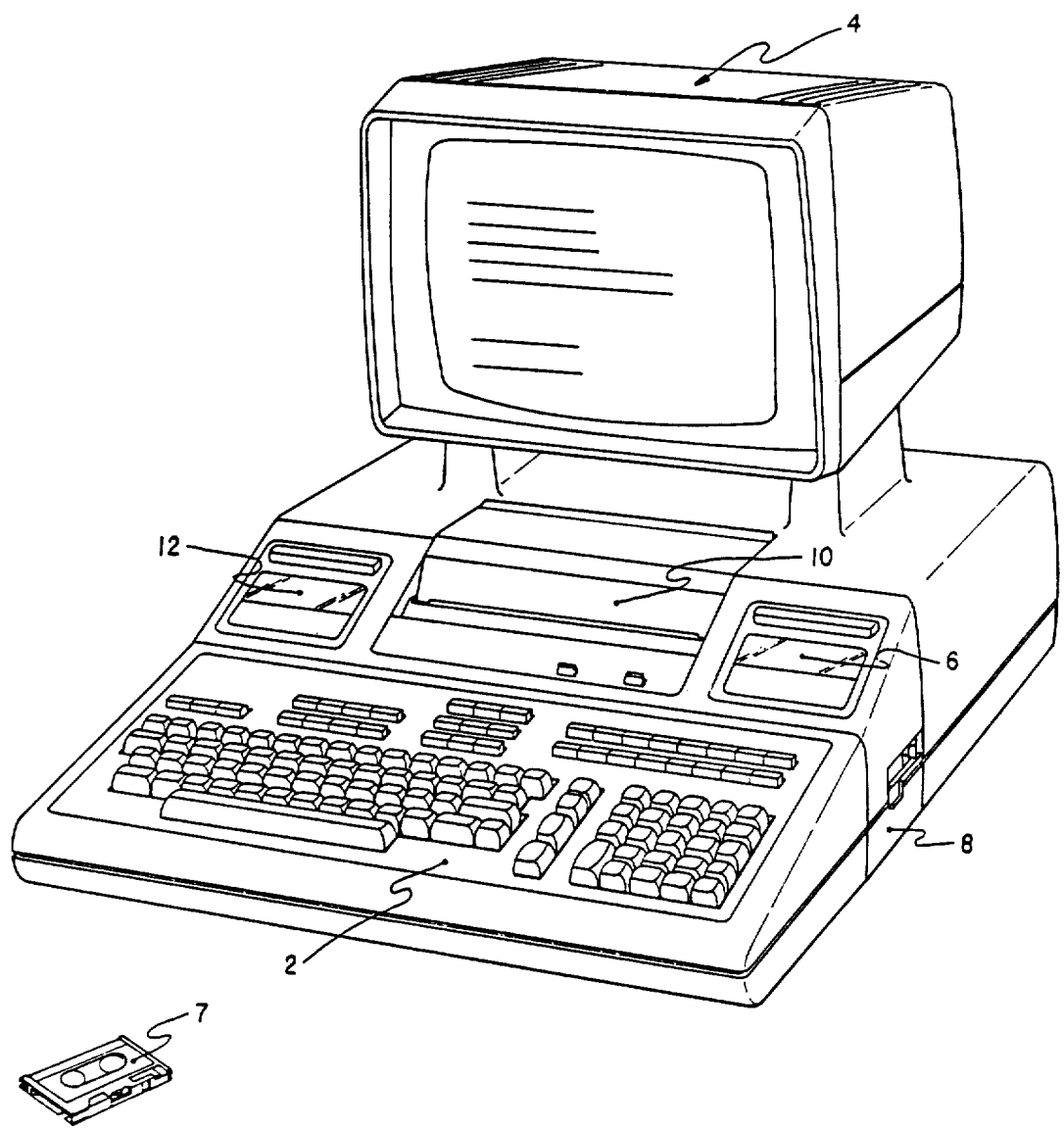
FIG. 1 is a front perspective view of a programmable calculator constructed according to the preferred embodiment of this invention.

Referring to FIG. 1, there is shown a programmable calculator including a keyboard unit 2 for entering programs, data, and for otherwise controlling the machine, and also including a CRT-monitor 4 which can be operated in an alphanumeric mode or in a graphics mode. In the alphanumeric mode the CRT presents 25 lines of 80 characters each, for the purpose of displaying commands given to the calculator by the operator via the keyboard, results or error messages in response to such commands, program listings, input data, error messages generated by the calculator in response to errors during program execution, formatted alphanumeric results generated by the program execution, and the results of computations executed from the keyboard.

The CRT can also be operated in a graphics mode wherein the display presentation consists of any pattern of dots within a rectangle of 560 dots wide by 455 dots high. When operated in the graphics mode, in a manner to be described later, each dot can be independently controlled by the user's program in a manner analogous to plotting, as to whether it is illuminated (on) or not (off). This allows the user to plot graphs or represent drawings of figures on the CRT screen. It is also possible to cause the internal thermal printer 10 to reproduce exactly, dot for dot, the image presented on the CRT during graphics mode operation.

The calculator also includes magnetic tape cartridge transport 6 and 12 for the storage and retrieval of information stored in the user's read-write memory portion of the calculator memory. (That area of memory is occasionally referred to as the user's R/W or user's RWM.) Such information can be stored on one or more external tape cartridges 7. Information to be written onto tape is grouped by the calculator into files (whose arbitrary names are chosen by the user) of appropriate yet arbitrary length at the time the tape is actually written. Information about the file structure of a particular tape is also recorded on that tape itself in a special file called the directory. The information in the directory makes possible file-oriented information retrieval from the tape. For example, the user can request that the information in the directory be displayed or printed in tabular form so that he may learn the names, sizes and types of the files on that tape, and then, for example, instruct the calculator to read one of those files into its memory. The file-by-name aspects of tape cartridge operation just discussed are a subset of a larger mass-storage capability of the calculator. The same file-by-name philosophy of information storage and retrieval is implemented for all mass-storage devices, for example, moving head discs. The operating system of the calculator is so devised that one unified set of mass-storage I/O commands works for all different types of mass-storage devices, thus enhancing the ease of use of the mass-storage system. The tape transports 6 and 12 are identical in their operational capabilities.

Also shown in FIG. 1 is an internal thermal printer 10. The printer prints 80 characters per line; each character is formed as a 5 by 7 dot matrix located in a 7 by 12 dot field. Thus, the line is of a length equivalent to 560 dots (field width times number of characters is 7 times 80=560). Unlike printers intended to print only alphanumeric information, wherein the space between characters never contains printed information, the calculator's printer has a printhead with 560 equally space print-resistors manufactured on a single substrate. This capability to print an unbroken equally spaced row of dots is fundamental to the calculator's abiltiy to do a dot-for-dot transfer of the thermal printer of a graphics mode CRT image. Additional important capabilities of the printer include: the ability to print a full 128 character ASCII character set, which is always available; the ability to print one among a plurality of optional and supplemental character sets that are provided in the form of ROM internal to the printer; the ability of the printer to allow the user to define a plurality of character dot patterns of his own choice; the ability of the printer to physically back the paper up one line (after it has been printed) and overstrike (i.e., reprint) any or all of the characters in the line with the characters of a second line; the ability of the printer to print characters that are 150% high or that are underlined, or both; the ability of the printer to change the vertical spacing between lines; and the ability of the printer to set, clear, and skip to horizontal tabs.

Referring now to FIG. 1 there is shown the locations of one of two plug-in ROM drawers 8. Each drawer can contain as many as eight ROM packages. Each ROM package can, in turn, contain as many as eight permanently mounted 1K by 16-bit ROM's. Each ROM is a complete IC chip which decodes entire 16-bit addresses and responds, on its own, to read memory cycles addressed to it. Since each ROM IC chip decodes its own address, the position of a chip in a ROM package is of no real consequence. Likewise, the positions of the various ROM packages in the ROM drawer is of no logical concern with respect to the architecture of the memory. (ROM packages are keyed to the ROM drawer, but this is for mainly human factors reasons.) Manufacturing considerations and compatible options are among the things that determine which particular ROM chips are included in the various ROM packages.

ROM packages are specific to a given ROM drawer, however. The two ROM drawers serve logically different functions within the dual-processor and memory address extension architectures of the calculator. The architectures of dual processor usage and memory address extension are discussed in detail later. In general terms, the difference involves the distinction between code that is executed by one element of the processor called the PPU, and code that is executed by another element of the processor called the LPU. A given section of code is written for execution by one or the other of these processor elements, but never both. One ROM drawer contains main system and option ROM's for execution by the PPU, and has generally to do with the management of I/O related tasks. Another ROM drawer 8 contains main system and option ROM's for execution by the LPU. In general, the LPU handles syntaxing and computational tasks. The exact relationship between the LPU and PPU is complicated, and will be the subject of much later discussion. But in simple terms, the LPU instructs the PPU to handle the I/O engendered by executing statements from the keyboard or running programs originated by the user. In addition, each processor can request the other to perform some task. The PPU can request perhaps a dozen such things from the LPU, while the LPU can make less than half a dozen different types of requests of the PPU. But the most commonly occurring interaction between the two processors is the one already mentioned: PPU managed I/O at the behest of the LPU.

The calculator embodies a unique memory address extension scheme wherein the amount of memory in the calculator exceeds the amount that can ordinarily be addressed by either processor (the LPU or the PPU). This additional memory space is not gained by the mere expedient of conjoining the two address spaces of those two processors; it is instead a means whereby a single processor can access as many as sixty-four 32K word blocks of read/write or read-only memory.

USE OF THE KEYBOARD

Figure 8B:
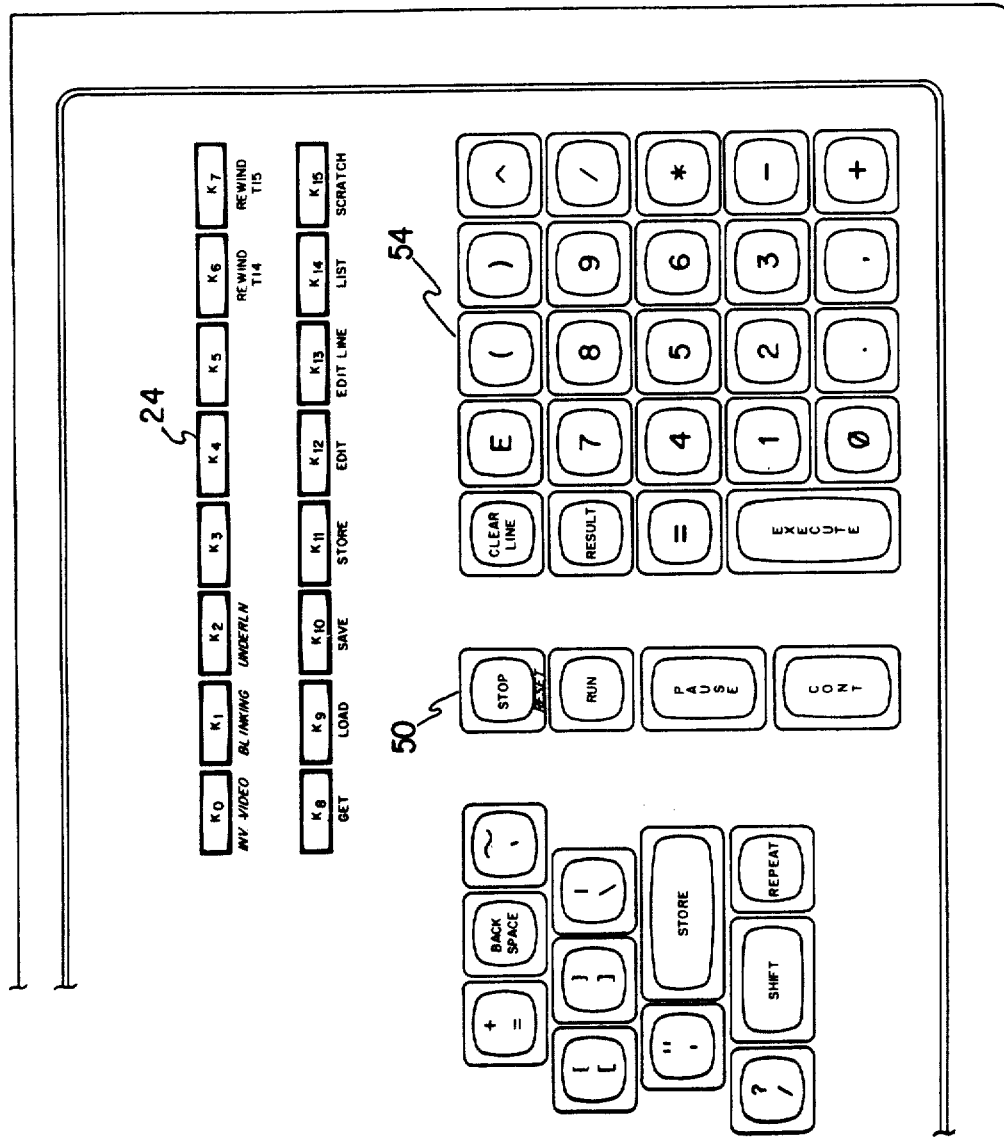

Referring now to FIG. 8B, the keyboard comprises seven general classes of keys: the display control keys 44 (already explained); the user-definable keys 24 (hereafter referred to as UDK's); the general ASCII character entry keys 52; the numeric key-pad 54; the calculator control keys 50; the typing function keys 48; and the edit/system function keys 46.

The following explains the EXECUTE and STORE keys.

EXECUTE key

The EXECUTE key is used to signal the calculator that statements or commands previously keyed in are now ready for immediate execution: RUN<line i.d.>; CONT<line i.d.>; etc. Most programmable statements can be executed if the line number is omitted. An expression may be evaluated by typing it in and pressing EXECUTE. Several expressions may be separated by commas or semicolons, and then executed. The result is the same as if they were treated as a <list> on a DISP statement. In this case there is an "implied display", but the result(s) appear in line #25, rather than in the display-line (line #22) of the display.

STORE key

The STORE key is used to cause a program line in the keyboard-entry lines (of either the normal or program-edit/entry sub-modes) to be syntaxed and stored in program memory. A line number must precede every line to be processed by STORE.

The following explains the calculator control keys 50.

This group of keys allow the user to directly control operation of the machine.

RUN key

The RUN key is an "immediate-execute" key. That is, the action which it causes takes place immediately without the need to press any other key.

The RUN key causes the program currently stored in memory to begin execution at the lowest existing line number. All variables, file references and subroutine-return pointers are cleared. If the display was in the program-edit/entry sub-mode, it will revert to the normal display sub-mode. If there already is a currently executing program, it will not be disturbed, but an error message will be displayed.

If the user wishes to begin execution at a specific line (rather than the lowest line number) he may key in, by use of the character entry keys 52 and numeric keys 54, RUN<line i.d.> and press the EXECUTE key. The <line i.d.> may be a <line no.> or a <label>, and must exist in the main program, and not in a subroutine.

CONT key

The CONT key is an immediate-execute key which causes the program to resume execution from wherever it was previously PAUSE'd, (i.e. halted by a PAUSE keystroke external to the program, or by a PAUSE statement within the program) or from the beginning if it had not been previously PAUSE'd. All variables, file references and subroutine return pointers are left unchanged.

If the program is halted waiting for data to be supplied for an INPUT or LINPUT or EDIT statement, CONT is used to signal that one or more data items have been entered in the input buffer (i.e., the keyboard-interactive line 58), and that they should be submitted as input data.

If the user wishes to resume execution at a specific line, he may key CONT<line i.d.> into the keyboard-line (using key-groups 52 and 54) and press EXECUTE.

The <line i.d.> must exist either in the current subprogram or in the main program, or else an error results.

PAUSE key

PAUSE is an orderly suspension of program execution which can be resumed without any effect on overall results. PAUSE causes program execution to halt at the end of the line presently being executed. If the PAUSE key itself is pressed the next program line will be displayed in line #25 of the display. The PAUSE key is an immediate execute key, and as such, cannot be part of a line to be stored. If a PAUSE statement is to be stored in a program it must be keyed in character-by-character. A PAUSE statement encountered in a program does not cause line #25 to display the next program line to be executed upon resumption of program execution, as does the PAUSE key.

Any output generated into buffers and awaiting processing will be retained, and actual output processing will continue (i.e., PAUSE stops further program execution), but not I/O processing required to satisfy previous program execution.

Execution can be resumed with the STEP or CONT keys, or by executing the CONT<line i.d.> command.

STOP key

STOP is an immediate-execute key which cuases the program to halt, and may result in lost input or output, if the program is running in OVERLAP mode (the OVERLAP mode is described later).

Program execution cannot be resumed as though nothing had happened. All data values are retained, but all program-execution temporaries (subroutine return pointers, FOR/NEXT conditions, etc.) have been cancelled, and the program-pointer is reset to the first line of the program. If CONT is pressed, execution will begin at the first line; it will be as though the program had not been RUN (except that all data values are retained). If STEP is pressed, the result is quite different than CONT (because the STEP will not be following a PAUSE) in this one case. STEP is treated as RUN-PAUSE for the first line (cancelling all data values) and the normal CONT-like function from then on (PAUSE has effectively been executed).

CONTROL-STOP key combination

CONTROL and STOP, when pressed together (but in that order) are used to reset the machine. An existing program will be preserved if it is not executing. If there is a program executing when CONTROL-STOP is pressed, the program may or may not be preserved. Any pending or executing I/O activity will terminate immediately.

CONTROL-STOP must always be considered as a potentially abortive termination of all machine activity; i.e., just short of turning the power off and back on. Every attempt is made to preserve programs and data, but nothing can be guaranteed or assumed. The purpose of this function is to reset the machine if it becomes "hung up" or "gets lost" because of a system or I/O malfunction.

STEP key

STEP is an immediate execute key which causes the isolated execution of the next line of a program. This is generally achieved by having STEP perform a CONT followed immediately by a PAUSE. STEP can be used only by pressing the STEP key; keying the separate letters followed by an EXECUTE will result either in a syntax error or in an attempt by the calculator to treat the resulting "STEP" as a variable name.

To use STEP the program must not be already executing. This condition exists in these situations. First, the program might never have been started after it was entered. In that case STEP causes a RUN immediately followed by a PAUSE. Secondly, the program might already have been started but have been halted with a PAUSE. In this case STEP causes a CONT immediately followed by a PAUSE. Lastly, the program might have been started and then halted with STOP. In that case STEP starts the program over with RUN followed immediately with PAUSE.

STEP may also be used within a line to signal that the response to an INPUT, EDIT, or LINPUT is ready.

PRINT ALL key

PRINT ALL is a mechanically latching key; that is, press to set, press to release.

When latched, PRINT ALL causes all information resulting from keyboard entries, DISP statements, error messages, trace messages, and calculations executed from the keyboard to be copied on the print-all device. The print-all device is defaulted to the display's print area at turn on, and may be changed to any other print-device by the PRINT ALL IS command (described later).

It was mentioned in the description of the display modes that the display's print area could function much as a "paperless teletype" or conventional CRT computer terminal. With PRINT ALL pressed, and both PRINTER IS and PRINT ALL IS directed to the display (pseudo-device 16), the display's print area displays a sequential log of all user operations and all computed results.

AUTO ST key

The AUTO ST (auto-start) key is also a mechanically latching key, in the same manner as the PRINT ALL key.

When AUTO ST is latched down, the machine will execute the command LOAD"AUTOST",1∅,1∅ automatically when power is turned on (or when power comes back on after a power failure). (The LOAD statement is a mass-storage system command and is described later.)

The user can use this capability to reactivate the machine by providing a program called "AUTOST" on the tape in the primary tape transport called "T 15", (reference numeral 6 in FIG. 1). This program can be written by the user to provide any function he desires, such as loading keys, subroutines, etc. This program must be put on the tape with a STORE command and given the name "AUTOST". The LOAD and STORE statements are discussed in the section dealing with the mass storage system.

The following explains the user-definable keys 24.

This group of keys, marked $k_0$ through $k_{15}$, provide a variety of useful capabilities to the user. There are 4 major areas: predefined print-aids for frequently-used commands and operations; user-definable print-aids; user keyboard-interrupt of executing programs; and last, control of special features of the CRT display.

Physically, there are 16 keys labeled $k_0$ to $k_{15}$. In addition, they may be shifted by pressing the SHIFT key and then a UDK to obtain, respectively, $k_{16}$ through $k_{31}$.

User-definable print-aids

One purpose of user-definable print-aids is to allow the user to define frequently used operations on a UDK so that they can be performed by a single keystroke. The other major use is to allow the user, as he needs them, to define frequently used words, phrases, parts of statements, or whole statements, as typing-aids. Once established, these phrases, etc., corresponding to the typing-aids are entered into the keyboard-entry area of the display at a single keystroke, with the cursor in the next character position after the entry. The entry may be edited, etc., just as if the user had keyed it in character-by-character. If EXECUTE or STORE is made part of the UDK's definition then the associated phrases, etc., will also then be EXECUTE'd or STORE'd.

The definition of UDK's for either of the above functions (immediate-execution operations, or simple print-aids) is the same kind of process. Which variety is obtained is determined by the keys entered in defining the UDK.

Defining and/or editing UDK's

The method for defining, replacing, or altering any UDK as an immediate-operation key or print-aid is to:
a. Type EDIT
b. Press the desired UDK ($k_0$ through $k_{31}$) or to:
a. Type EDITKEY <n>
b. Press EXECUTE Both operations are equivalent.

During the EDITKEY operation, the display switches to a special presentation which is unique to the EDITKEY operation, but is similar to the program-edit/entry sub-mode.

The work KEY followed by the number of the UDK being edited or defined is displayed in the top line of the display. If the UDK is undefined, the cursor will appear in the middle line of the display, waiting for a key definition to be entered.

If the UDK is presently defined, a display of that definition will appear in the middle line (line #13), and possibly lines above that, depending on the exact definition. The cursor will initially appear in the middle line immediately after the last character (keycode) in the definition, but its subsequent location will depend upon subsequent editing operations.

The definition of a UDK, as stored, is a string of bytes which are the keycodes from the keyboard itself. When (in normal keyboard sub-mode, not UDK edit/entry sub-mode) the UDK is pressed, these keycodes (which are the definition of the UDK) are submitted sequentially to the keyboard-input routine as though they came from the keyboard itself by the user's pressing that key-sequence. So the user can, effectively, press many keys in rapid sequence by pressing a single defined UDK. In fact, each UDK can contain up to 70 other keycodes.

Using this generalized definition of what UDK's as print-aids do, their use can be broadened from just "printable" (alphanumeric) keys to almost every key on the keyboard. In fact, there are only six keys which cannot somehow be entered as a part of any UDK definition. These are:
1. TYPWTR
2. PRINT ALL
3. AUTO ST
4. REPEAT
5. SHIFT LOCK
6. STOP Additionally, the UDK itself may not be used in its own definition. This would invoke an endless recursion. During the definition of a UDK, if the UDK itself is pressed, the "definition phase" is terminated, and causes the definition to be stored.

The STOP key may be used at any time to abort the editing of the key, without storing anything.

The character-editing keys:
1. →
2. ←
3. DEL CHR
4. INS CHR can be entered as part of a UDK definition. This implemented, during EDITKEY operation only, by pressing CONTROL and the respective one of those four keys.

Simply pressing these keys themselves causes their actual editing function to take place.

Many of the keys on the keyboard do not have a directly-printable character which can be displayed to indicate their presence. The alphabetic numeric and punctuation keys (printable characters) can be displayed directly. But, keys such as RECALL, STEP, STORE, etc. cannot. To represent these keys, a mnemonic keyword is displayed on a separate line.

These mnemonics are:

| NON-ASCII KEY IDENTIFIERS | |
|---|---|
| KEYS: | MNEMONICS: |
| TAB | -Tab |
| TAB SET | -Tab set |
| TAB CLR | -Tab clear |
| DEL CHR | -Delete character |
| DEL LN | -Delete line |
| RECALL | -Recall |
| STEP | -Step |
| INS CHR | -Insert character |
| INS LN | -Insert line |
| ROLL ↑ | -Roll up |
| ↑ | -Up arrow |
| ROLL ↓ | -Roll down |
| ← | -Left arrow |
| HOME | -Home |
| → | -Right arrow |
| CLEAR | -Clear |
| ↓ | -Down arrow |
| CLR→END | -Clear to end |
| BACK SPACE | -Left arrow |
| STORE | -Store |
| CONT | -Continue |
| EXECUTE | -Execute |
| PAUSE | -Pause |
| RUN | -Run |
| CLEAR LINE | -Clear line |
| RES | -Result |
| $K_n$ | -Key $<n>$ |
| CONTROL/$K_0$ | -Control inverse video |
| CONTROL/$K_1$ | -Control blinking |
| CONTROL/$K_2$ | -Control underline |
| CONTROL/$K_3$ | -Control protected field |
| CONTROL/$K_4$ THRU $K_{31}$ | -Undefined |

Each mnemonic has a hyphen in front of it, and is written primarily in lower case letters. These are to help distinguish the appearance of these mnemonics from what it would normally be by actually keying the same words in character-by-character.

As these keys are pressed as part of a UDK definition, the previous parts will scroll up in the display, and the mnemonic for the key just pressed will appear on the line just above the cursor, with the cursor in the entry area ready for another key.

If ← is used to move the cursor back into the previously defined area, the display will scroll down; but it will do so by one line for each mnemonic, with the cursor under the hyphen of the mnemonic. If a different key is pressed, the entire mnemonic will change. The user cannot change individual characters of these mnemonics, since they stand for single characters (keycodes), and it is a single keycode which is being changed. The mnemonic is only a convenient way to show what that keycode is.

The scrolling up and down when → or ← are pressed may be unexpected, as that is associated normally with ↑ and ↓, not → and ←. But, it must be recognized that: the mnemonics are on individual lines for convenience and visibility in the display; that they represent a left-to-right sequence of characters (keycodes); and that it is this sequence of characters that the cursor is moving through. When ordinary printable characters are entered, they are displayed along a line, as expected, and can be stepped through with the cursor, a character at a time.

As mentioned, all keys on the keyboard (with noted exceptions) can be a part of a UDK definition. This includes keys such as RUN, PAUSE, STEP, etc., which, when pressed from the keyboard, in normal sub-mode, cause an immediate action. When these actions are invoked by these keys within a UDK when it is executed, they terminate the UDK function, since they tell the machine to perform some other function. Thus, while these keys can be entered in a UDK definition, only one such key can appear in a UDK, and it terminates the UDK definition; i.e., it must be the last key.

These special terminator keys are:

| -STORE | -RUN |
|---|---|
| -CONTINUE | -PAUSE |
| -EXECUTE | -STEP |
| -INSERT LINE | -DELETE LINE |

Additionally, if the UDK is to be used while the machine is in the program-edit/entry sub-mode (i.e., while entering or editing program lines in the EDIT LINE sub-mode) there are additional restrictions in that the keys

-↑
-↓
-ROLL ↑
-ROLL ↓ will cause the program-display to scroll up or down (changing the line being edited), and these will terminate UDK execution. If other keycodes follow those keys in the UDK, they are not processed.

Listing UDK's

Individual keys may be listed by:
1. Typing LIST
2. Pressing the UDK or:
1. Typing LIST KEY $<n>$ ($0<n<31$)
2. Pressing EXECUTE or:
1. Typing LIST KEY #$<sc>$, $<n>$ ($<sc>$ is a select code)
2. Pressing EXECUTE The first two methods cause the key to be listed on the default print device (defined by PRINTER IS). The last method lists to the specified device, rather than to the default print device.

All UDK's are collectively listed by:
1. Typing LISTKEY
2. Pressing EXECUTE or:
1. Typing LISTKEY #$<sc>$
2. Pressing EXECUTE Scratching UDK's Individual keys may be scratched (made undefined) by:
1. Typing SCRATCH
2. Pressing the UDK or:
1. Typing SCRATCH KEY $<n>$ ($0<n<31$)
2. Pressing EXECUTE All UDK's are collectively scratched by:
1. Typing SCRATCH KEY 2. Pressing EXECUTE
Predefined commands and keywords When the system is turned on, or when SCRATCHA is executed, some of the UDK's are predefined by the system, as indicated by the label beneath them on the keyboard bezel. See FIGS. 8A-B. The purpose is to provide frequently-used functions or keywords for user convenience. However, the user may, at any time, change the definition of part or all of these predefined UDK's, as he desires.

Recalling how UDK's are defined as user print-aids, where almost any key may be entered on the UDK, including control keys such as CONT and EXECUTE, FIG. 12 shows the listings of the 31 UDK's as they appear just after turn-on. $K_6$ through $K_{15}$ have pre-definitions, as shown by the FIG. 12 as shown in U.S. Patent 4,180,854. The remaining UDK's are undefined at turn-on.

Keyboard-interrupt of programs by UDK's.

In addition to their use as print-aids and immediate-execute functions related to keyboard operations, frequently-used data entries, etc., the UDK's can be used to directly affect the operation of a running program. This is done by that the user's incorporating ON KEY# declaratives, and their associated routines, into the program (the syntax for this is described later).

When an ON KEY# declaration for a key occurs, the function of the declared UDK becomes the activation of the ON KEY# operation, and any print-aid or immediate-execute function is suspended. The print-aid definition is not lost, and in fact, print-aid definitions may be keyed-in, edited, listed, stored or loaded from mass-storage (with STORE KEY and LOAD KEY) even though ON KEY# is active. But, if the UDK is (physically) pressed alone, the system first checks if an ON KEY# declaration for that key# (i.e., for that UDK) is active. If it is, the interrupt occurs. The nature of the interrupt is an automatic branch to some special part of the program, regardless of where in the program the line counter currently points. A multi-level priority scheme allows assignment of priorities to the interrupts caused by the UDK's so that some UDK's can interrupt other in-progress UDK's, but not vice versa. If there is no ON KEY# active, the print-aid definition (if one exists) is carried out. Whenever a program containing an ON KEY# is not actually running the ON KEY# is deactivated, and the print-aid definition is again available.

The physical pressing of a UDK is necessary to activate the ON KEY# interrupt. It cannot be activated indirectly by the appearance of the key in during the use of a print-aid on another key which "calls" the first key; only the print-aid definition will be used.

Suppose, for example, that these UDK print-aid definitions were in effect:

| KEY0 | Key1 |
|------|------|
| 123K$_1$ | 456 |

Also suppose that ON KEY#1 has occurred during a running program.

Pressing $K_0$ causes the entry of 123456 in the display. The ON KEY#1 is not activated.

Pressing $K_1$ activates ON KEY#1; the print-aid 456 is not used.

We claim:

1. An electronic computer comprising:

keyboard input means having a plurality of keys for entering alphanumeric information, including commands, into the computer;

memory means for storing alphanumeric information entered into the computer from said keyboard input means;

processing means, coupled to said keyboard input means and memory means, for processing alphanumeric information, including alphanumeric information entered from said keyboard input means; and display means, coupled to said processing means, for providing a visual display of alphanumeric information as it is being entered into the computer from said keyboard input means and of the results of alphanumeric information processed by said processing means;

said keyboard input means including a plurality of user-definable keys and means for permitting the user to associate specified alphanumeric information with a selected one of said definable keys;

said computer including logic means, coupled to said processing means, said logic means being responsive to the application of operating power to the computer for causing certain predetermined alphanumeric information that is not specified by the user to be associated with one of said plurality of user-definable keys and to remain so associated therewith until such time as the user associates different alphanumeric information with said one of said plurality of user-definable keys.

* * * * *

UNITED STATES PATENT AND TRADEMARK OFFICE
CERTIFICATE OF CORRECTION

PATENT NO. : 4,455,618

DATED : June 19, 1984

INVENTOR(S) : Jack M. Walden et al.

It is certified that error appears in the above-identified patent and that said Letters Patent is hereby corrected as shown below:

On the title page

Item [54], "PROGRAMMABLE CALCULATOR" should be --PROGRAMMABLE CALCULATOR INCLUDING USER-DEFINABLE KEYS HAVING DEFAULT DEFINITIONS ASSOCIATED THEREWITH--;

Column 1, line 1, "PROGRAMMABLE CALCULATOR" should be --PROGRAMMABLE CALCULATOR INCLUDING USER-DEFINABLE KEYS HAVING DEFAULT DEFINITIONS ASSOCIATED THEREWITH--;

Column 3, line 51, "abiltiy" should be --ability--;

Column 5, line 10, "is" should be --is--;

Column 6, line 4, "not" should be --not--;

Column 6, line 15, "cuases" should be --causes--;

Column 6, line 19, "cannot" should be --cannot--;

Column 6, line 26, "are" should be --are--;

Column 9, line 54, "line" should be --line--;

Column 9, line 54, "nmemonic," should be --mnemonic,--;

Column 9, line 56, "entire mnemonic" should be --entire mnemonic--;

Column 11, line 46, "running" should be --running,--;

Column 11, line 50, "cannot" should be --cannot--;

Signed and Sealed this

Ninth Day of July 1985

[SEAL]

Attest:

DONALD J. QUIGG

Attesting Officer

Acting Commissioner of Patents and Trademarks